(12) United States Patent
Monin et al.

(10) Patent No.: US 10,219,170 B2
(45) Date of Patent: Feb. 26, 2019

(54) METHODS AND DEVICES FOR CHANNEL ESTIMATION

(71) Applicant: Intel IP Corporation, Santa Clara, CA (US)

(72) Inventors: Maxime Monin, Plousane (FR); Lea Castel, Aalborg (DK); Tommaso Balercia, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/390,785

(22) Filed: Dec. 27, 2016

(65) Prior Publication Data

US 2018/0183647 A1   Jun. 28, 2018

(51) Int. Cl.
*H04L 27/26* (2006.01)
*H04W 24/02* (2009.01)
(Continued)

(52) U.S. Cl.
CPC .......... *H04W 24/02* (2013.01); *H04L 25/022* (2013.01); *H04L 25/024* (2013.01);
(Continued)

(58) Field of Classification Search
CPC ... H04L 1/005; H04L 5/0048; H04L 25/0236; H04L 25/067; H04L 25/0226;
(Continued)

(56) References Cited

U.S. PATENT DOCUMENTS 8,166,379 B1 * 4/2012 Wu .................. H03M 13/6583
                                                       714/794
2002/0165004 A1 * 11/2002 Chen .................... H04L 1/0051
                                                       455/522
(Continued)

FOREIGN PATENT DOCUMENTS

EP   2536082 A1   12/2012
EP   2846504 A1    3/2015
WO   2015115848 A1  8/2015

OTHER PUBLICATIONS

Park et al. "Iterative channel estimation using virtual pilot signals for MIMO-OFDM systems" IEEE transaction of signal processing; vol. 63; Jun. 15, 2015; pp. 3032-3045.*
(Continued)

*Primary Examiner* — Rahel Guarino
(74) *Attorney, Agent, or Firm* — Viering, Jentschura & Partner MBB

(57) ABSTRACT

A device and method for performing channel estimation, including in a first iteration of channel estimation, determining a channel estimate based on at least a first pilot symbol of a reference signal received at the device; and in each respective iteration of one or more ensuing iterations determining a reference channel estimate based on at least one subsequent pilot symbol of the reference signal; decoding a data signal received at the device based on the reference channel estimate; determining a data channel estimate based on at least one data symbol from the decoded data signal; and calculating a channel estimate for the
(Continued)

respective iteration based on the reference channel estimate, the data channel estimate, and a channel estimate from a previous iteration.

24 Claims, 6 Drawing Sheets

(51) Int. Cl.
*H04L 25/02* (2006.01)
*H04B 7/08* (2006.01)
*H04L 5/00* (2006.01)

(52) U.S. Cl.
CPC ........ *H04L 25/0224* (2013.01); *H04B 7/0854* (2013.01); *H04L 5/0007* (2013.01)

(58) Field of Classification Search
CPC ............... H04L 27/261; H04L 25/0202; H04L 27/2675; H04L 25/0228; H04L 25/0256; H04L 25/03292; H04L 25/03318; H03M 13/3784; H03M 13/45; H04W 72/0413; H04W 72/042
See application file for complete search history.

(56) References Cited

U.S. PATENT DOCUMENTS

| | | |
|---|---|---|
| 2015/0078494 A1 | 3/2015 | Talvitie et al. |
| 2016/0080174 A1* | 3/2016 | Choi ................... H04L 25/022 |
| | | 375/316 |
| 2016/0352463 A1 | 12/2016 | Vojcic et al. |

OTHER PUBLICATIONS

Jin et al. "A Novel channel estimation based on pilot-aided in LTE downlink systems"; IEEE conputer society;2014 pp. 424-428.*
Sunho Park et al., "Soft Decision-Directed Channel Estimation for Multiuser MIMO Systems", 2015 IEEE 26th International Symposium on Personal, Indoor and Mobile Radio Communications (PIMRC), pp. 95-99.
Hu et al.: 'A new pilot design criterion of channel estimation based on compressive sensing', 13th International Computer Conference on Wavelet Active Media Technology and Information Processing (ICCWAMTIP), 2016, pp. 119-122, IEEE.
International Search Report based on application No. PCT/US2017/067768 (3 pages) dated Apr. 17, 2018 (Reference Purpose Only).

* cited by examiner

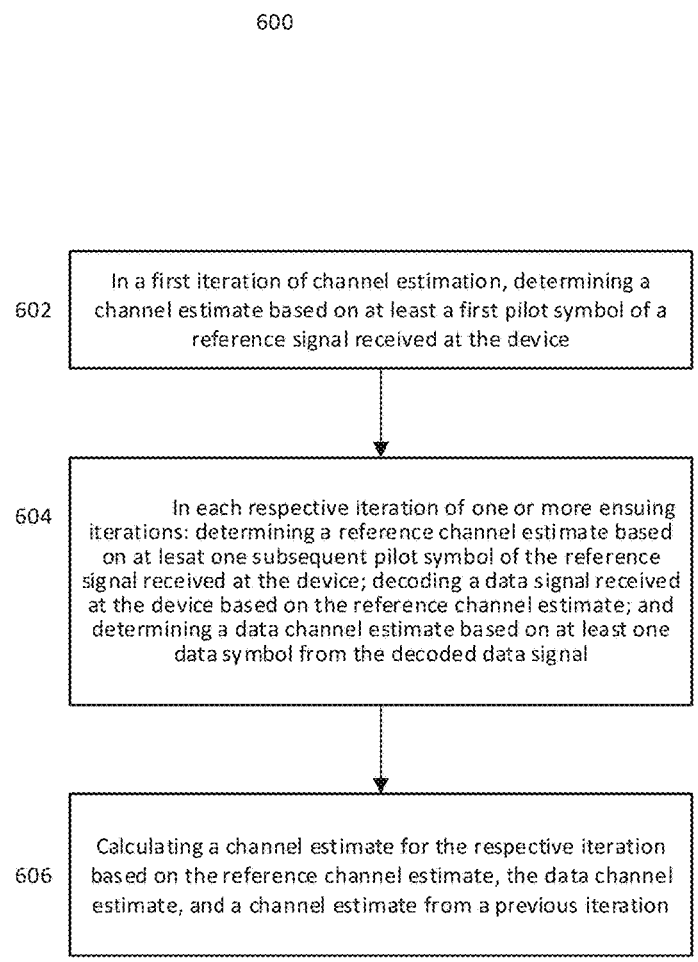

METHODS AND DEVICES FOR CHANNEL ESTIMATION

TECHNICAL FIELD

Various aspects of this disclosure relate generally to methods and devices for channel estimation in wireless communications.

BACKGROUND

Modern radio access technologies, such as Long Term Evolution (LTE), use Orthogonal Frequency Division Multiple Access (OFDMA) modulation schemes to overcome Inter-Symbol Interference (ISI) caused by multipath fading. OFDMA implements orthogonal spaced sub-carrier signals and inserts a cyclic prefix (CP) as a guard interval to eliminate ISI. To compensate for distortion resulting from the propagation of transmission of the signal through communication channels, the user equipment (UE) is required to perform channel estimation (CE) to increase capacity and allowing for proper signal detection and data demodulation. The more accurate the CE, the better the receiver is able to receive data from the transmitter.

To facilitate CE, LTE uses reference signals consisting of pilot symbols in the time and frequency domains to provide an estimate of the channel at given locations within a subframe. The pilot symbols are used to provide a reliable estimate of the complex gains of each resource element of signal transmission through the communication channel. Using the known pilot symbols to estimate the channel, the UE may equalize the effects of the communication channel and reduce the noise on the received signals.

Data aided CE improves the quality of CE by using data symbols acquired from the data signals in CE. The additional information gained from the estimated data is used in conjunction with information received from the reference signal in order to provide a more accurate CE. However, current CE methods, even data aided CE methods, do not provide good performance in conditions of special interest in mm-waves communications and in high Doppler scenarios.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 6 shows a flowchart describing a method in an aspect of this disclosure;

DESCRIPTION

Figure 1:
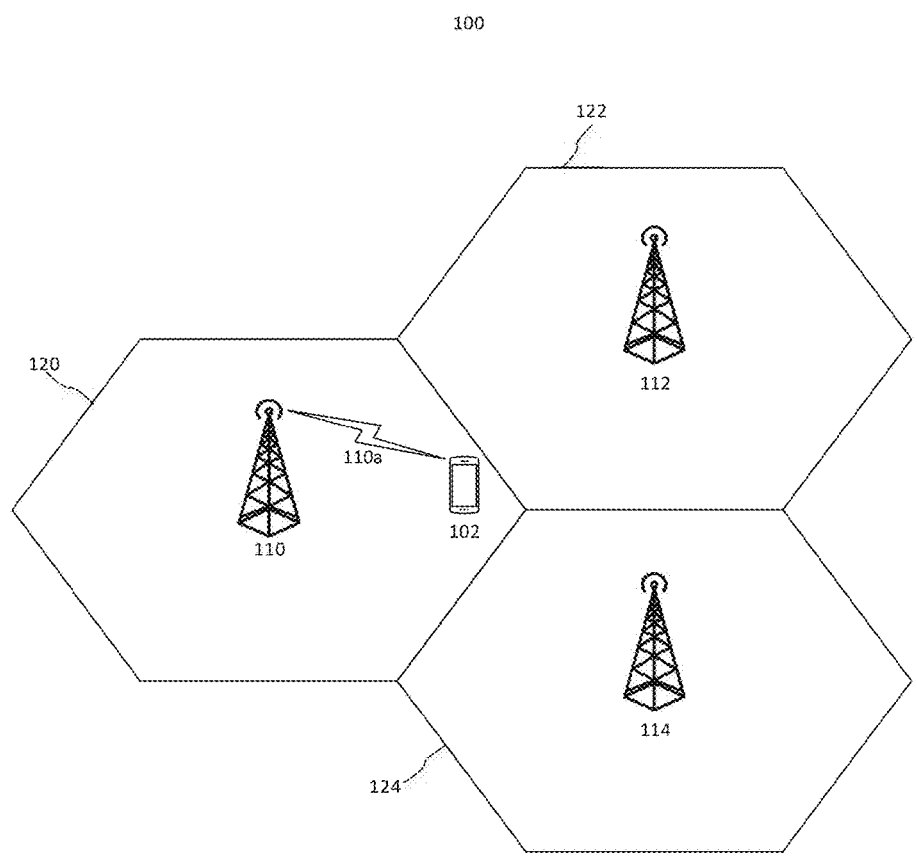
FIG. 1 shows a radio communication network in an aspect of this disclosure.

The following details description refers to the accompanying drawings that show, by way of illustration, specific details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The channel estimation methods and devices described in this disclosure use symbols obtained from both reference and data signals in aggregation with the previous channel estimation iteration in order to provide more accurate channel estimation for better signal reception.

FIG. 1 shows a radio access network 100 in an aspect of this disclosure. Network 100 may be an LTE network including a UE 102 and base stations 110-114. Base stations 110-114 may be LTE base stations (i.e. eNodeBs) and may provide coverage to cells 120-124, respectively. Furthermore, cells 120-124 may be sectorized, i.e. composes of multiple LTE cells. Although shown as having explicit boundaries in network 100, it is appreciated that cells 120-124 may have overlapping coverage.

UE 102 may exchange uplink and/or downlink data with one or more of base stations 120-124. For example, UE 102 may be connected to cell 120 via base station 110 over radio channel 110a. Furthermore, at least one of either UE 102 or base station 110 may be configured according to a Multiple Input Multiple Output (MIMO) scheme, in which case radio channel 110a may include a plurality of MIMO channels that each correspond to a unique path between a transmit antenna of base station 110 and a receive antenna of UE 102.

In order to maximize throughput and reliability in network 100, base station base station 110 may employ multiple user MIMO and digitally modulate the signals by OFDMA prior to transmitting signals to UE 102. However, in a multiple user scenario, time and frequency resources may be shared among multiple users. Accordingly, UE 102 may experience significant interference in communication channel 110a, leading to degradation in the quality of communications.

Accordingly, UE 102 may be configured to employ coherent detection methods by exploiting channel condition knowledge. Optimal reception at the UE 102 by coherent detection requires an estimation of signal propagation though communication channel 110a, i.e. channel estimation (CE). In order to perform the CE as accurately as possible, correlations between time, frequency, and space must be taken into account. For example, UE 102 may need to remain aligned with data symbol boundaries in the timing schedule used by base station 110 and may need to tune its receiver to the correct frequency that matches the transmitter of base station 110.

Figure 2:
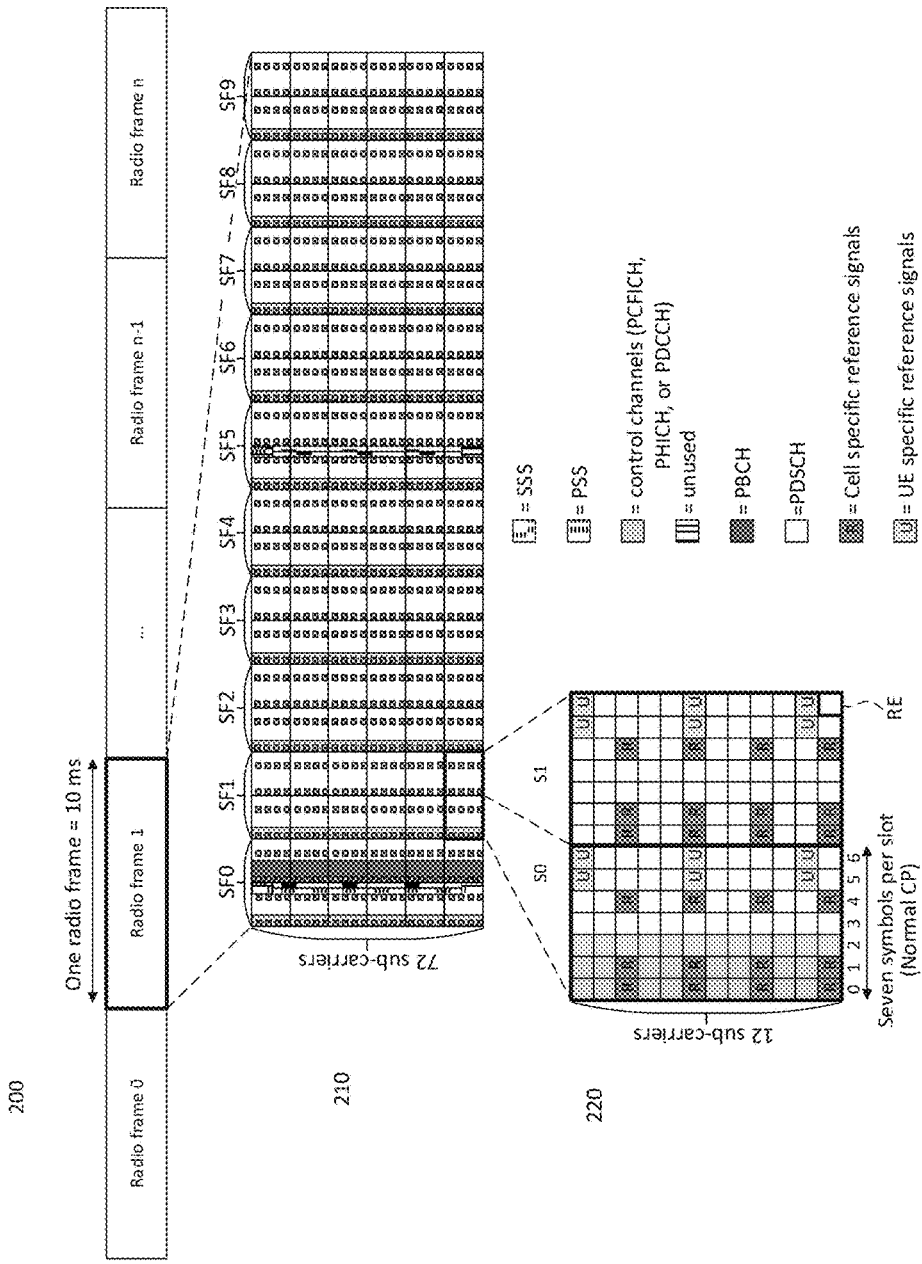
FIG. 2 shows an LTE downlink radio frame structure in an aspect of this disclosure.

FIG. 2 shows an exemplary LTE downlink radio frame structure 200 in the form of a resource grid. It is appreciated that radio frame structure 200 is exemplary in nature and may thus be simplified for purposes of this explanation.

An LTE radio frame is 10 ms in duration and is divided into ten subframes (SF0, SF1, . . . , SF9) of 1 ms each 210. Each subframe is further divided into two slots of 0.5 ms each, e.g. slot 0 (S0) and slot 1 (S1) shown in 220. Each slot is further divided into either six or seven symbols, depending on the cyclic prefix (CP) length. The CP is inserted at the beginning of each symbol in order to combat inter-symbol interference (not shown). If a normal CP is used, then each slot has seven symbols (as shown in 220). If an extended CP is used, then each slot contains six symbols (not shown). The radio frames are used to send system information between the UE and the eNB, while subframes facilitate resource allocation and slots are useful for synchronization.

In LTE, radio resources are allocated in Physical Resource Blocks (PRB). Each PRB contains 12 subcarriers and one slot. For example, if a normal CP is used, a PRB will contain 12 subcarriers transmitted over seven symbols. FIG. 2 shows the minimum number of subcarriers necessary to comply with the LTE bandwidth requirements, i.e. 72 sub-subcarriers.

Two PRBs in the second subframe (SF1) are demonstrated in more detail in the radio resource grid marked 220, i.e. twelve subcarriers across two slots (S0 and S1). As demonstrated in 220, Resource Elements (REs) in the downlink frame structure are allocated for cell-specific reference signals (CS-RS), indicated by the R blocks, and user equipment reference signals (UE-RS), i.e. demodulation reference signals (DMRS), indicated by the U blocks.

Each LTE base station transmits the CS-RSs according to a specific pattern which depends on the Physical Cell Identity (PCI) of the cell and the number of transmit antenna ports of each base station. An LTE base station with multiple antenna ports may transmit CS-RS symbols on each port with different REs, and thus, the resource grid showing the symbols transmitted from a base station from all of its transmit antennas may contain non-overlapping CS-RS symbols positioned at different REs.

The pilot sequences of the UE-RS are precoded by applying orthogonal cover codes (OCC) since pilot signals for different users are transmitted simultaneously, i.e. additional UE-RS may be transmitted in the radio frames simultaneously at different sub-carrier frequencies. For example, the REs directly beneath the UE-RS signals in FIG. 2 may be allocated as UE-RS for a different group of UEs.

The rest of the resource elements (REs) which are not allocated for reference signals, synchronization signals (Primary Synchronization Signal, PSS, and Secondary Synchronization Signal, SSS), and control channels (PCFICH, PHICH, or PDCCH) may be available for the transmission of data, i.e. for the Physical Downlink Shared Channel (PDSCH).

The channel estimation techniques disclosed herein may be derived via a system model of transmitted LTE signals. It is noted that while the disclosure herein may focus on an LTE context, the implementations detailed this disclosure may be analogously applied to any radio communication technology with reference symbols, in particular for reference symbols that are placed according to a specific pattern or evenly-spaced grid.

Figure 3:
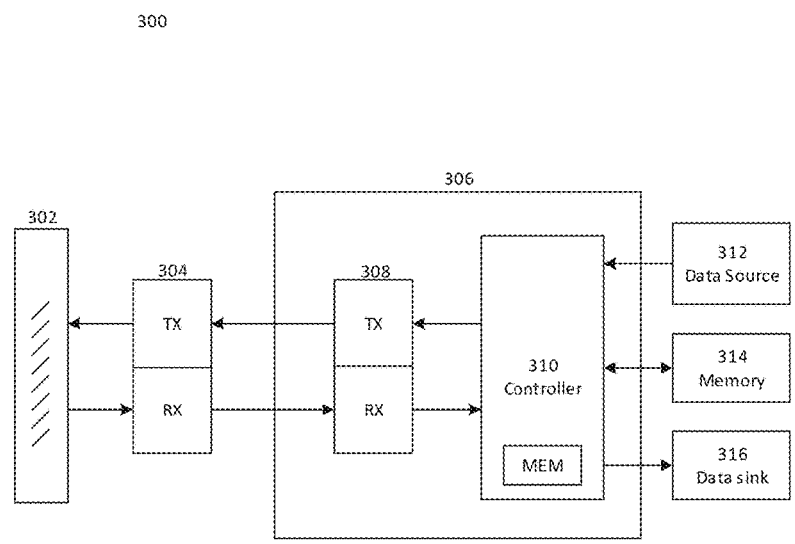
FIG. 3 shows an internal configuration of a user equipment (UE) in an aspect of this disclosure.

FIG. 3 shows an internal configuration of a UE 300, which may be configured to perform the adaptive filtering procedure of this disclosure. As shown in FIG. 3, UE 300 may include antenna system 302, radio frequency (RF) transceiver 304, baseband modem 306 (including physical layer processing circuit 308 and controller 310), data source 312, memory 314, and data sink 316. Although not explicitly shown in FIG. 3, UE 300 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 300 may transmit and receive radio signals on one or more radio access network (RANs), e.g. an LTE RAN. Baseband modem 306 may direct such communication functionality of UE 300 according to the communication protocols associated with each RAN, and may execute control over antenna system 302 and RF transceiver 304 in order to transmit and receive radio signals according to the formatting and scheduling parameters defined by each communication protocol.

UE 300 may transmit and receive radio signals with antenna system 302, which may be a single antenna or an antenna array composed of multiple antennas and may additionally include analog antenna combination and/or beamforming circuitry. The receive path (RX) of RF transceiver 304 may receive analog radio frequency signals from antenna system 302 and perform analog and digital RF front-end processing on the analog radio frequency signals to produce digital baseband samples (e.g. In-Phase/Quadrature (IQ) samples) to provide to baseband modem 306. RF transceiver 304 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 304 may receive digital baseband samples from baseband modem 306 and perform analog and digital RF front-end processing on the digital baseband samples to produce analog radio frequency signals to provide to antenna system 302 for wireless transmission. RF transceiver 304 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 306 to produce the analog radio frequency signals for wireless transmission by antenna system 302. Baseband modem 306 may control the RF transmission and reception of RF transceiver 304, including specifying transmit and receive radio frequencies for operation of RF transceiver 304.

As shown in FIG. 3, baseband modem 306 may include physical layer processing circuit 308, which may perform physical layer (i.e. Layer 1) transmission and reception processing to prepare outgoing transmit data provided by controller 310 for transmission via RF transceiver 304 and prepare incoming received data provided by RF transceiver 304 for processing by controller 310. Physical layer processing circuit 310 may accordingly perform one or more of channel estimation, adaptive filtering, error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 308 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 3, physical layer processing circuit 308 may include a control circuit such as a processor configured to control the various hardware and software processing components of physical layer processing circuit 308 in accordance with physical layer control logic defined by the communications protocol for the relevant radio access technologies (RATs). Furthermore, while physical layer processing circuit 308 is depicted as a single component in FIG. 3, physical layer processing circuit 308 may be collectively composed separate sections of physical layer processing circuitry where each respective section is dedicated to the physical layer processing of a particular RAT.

Physical layer processing circuit 308 may include hardware and/or software to implement the channel estimation methods of this disclosure.

UE 300 may be configured to operate according to one or more RATs, which may be directed by controller 310. Controller 310 may thus be responsible for controlling the radio communication components of UE 300 (antenna system 302, RF transceiver 304, and physical layer processing circuit 308) in accordance with the communication protocols of each supported RAT, and accordingly may represent the Access Stratum (AS) and Non-Access Stratum (NAS) (also encompassing Layer 2 and Layer 3) of each supported RAT. Controller 310 may be structurally embodied as a protocol processor configured to execute protocol software (retrieved from controller memory MEM as shown in FIG. 3) and subsequently control the radio communication components of UE 300 in order to transmit and receive communication signals in accordance with the corresponding protocol control logic defined in the protocol software.

Controller 310 may therefore be configured to manage the radio communication functionality of UE 300 in order to communicate with the various radio and core network components of a radio communication network, and accordingly may be configured according to the communication protocols for both the LTE network and the GSM/UMTS legacy network. Controller 310 may either be a unified controller that is collectively responsible for all supported RATs (e.g. LTE and GSM/UMTS) or may be composed of multiple separate controllers where each controller is a dedicated controller for a particular RAT, such as e.g. a dedicated LTE controller and a dedicated legacy controller (or alternatively a dedicated LTE controller, dedicated GSM controller, and a dedicated UMTS controller). Regardless, controller 310 may be responsible for directing radio communication activity of UE 300 according to the communication protocols of the LTE and legacy networks. As previously noted regarding physical layer processing circuit 308, one or both of antenna system 302 and RF transceiver 304 may similarly be partitioned into multiple dedicated components that each respectively correspond to one or more of the supported RATs. Depending on the specifics of each such configuration and the number of supported RATs, controller 310 may be configured to control the radio communication operations of UE 300 in accordance with a master/slave RAT hierarchical or multi-SIM scheme.

UE 300 may further comprise data source 312, memory 314, and data sink 316, where data source 312 may include sources of communication data above controller 310 (i.e. above the NAS/Layer 3) and data sink 316 may include destinations of communication data above controller 310 (i.e. above the NAS/Layer 3). Such may include, for example, an application processor of UE 300, which may be configured to execute various applications and/or programs of UE 300 at an application layer of UE 300, such as e.g. an Operating System (OS), a User Interface (UI) for supporting user interaction with UE 300, and/or various user applications. The application processor may interface with baseband modem 306 (as data source 312/data sink 316) as an application layer to transmit and receive user data such as voice data, audio/video/image data, messaging data, application data, basic Internet/web access data, etc., over a the radio network connection(s) provided by baseband modem 306. Data source 312 and data sink 316 may additionally represent various user input/output devices of UE 300, such as display(s), keypad(s), touchscreen(s), speaker(s), external button(s), camera(s), microphone(s), etc., which may allow a user of UE 300 to control various communication functions of UE 300 associated with user data.

Memory 314 may include a memory component of UE 300, such as e.g. a hard drive or another such permanent memory device. Although not explicitly depicted in FIG. 3, the various other components of UE 300 shown in FIG. 3 may additionally each include integrated permanent and non-permanent memory components, such as for storing software program code, buffering data, etc.

The ensuing disclosure describes methods by which the physical processing layer circuit 308 component of the baseband modem 306 implements data aided CE techniques in order to more accurately estimate signal propagation through communication channels, thereby improving performance.

Data aided channel CE refers to a set of iterative techniques aimed at improving the quality of CE by feeding the estimated received data back into the estimation process. While there are different strategies as to how best implement this feedback, the disclosure herein encompasses an iterative scheme referred to as Enhanced Virtual Pilot Assisted (E-VPA) CE. Specifically, the devices and methods described herein provide for improved performance in high Doppler scenarios and pilots such as the UE-RS found in LTE.

VPA CE is a data-aided CE scheme aimed at improving the estimation of the channel by means of a set of selected estimated data symbols (i.e. PDSCH REs) called virtual pilots. Using a selected set of data symbols, as opposed to all of them, yields several advantages. One advantage is minimization of error propagation by selecting only the most reliable symbols. Another advantage is the reduction of computational complexity since the amount of data that needs to be processed is smaller.

Given a set of UE-RSs, the VPA method aims at deriving better estimates of the channel by complementing the standard estimates obtained from the pilots with progressively improving estimates derived from the data symbols. The disclosure herein is based on iterations which make use not only of the improving quality of the estimates obtained on the data symbols, but also of those computed on the pilots.

With every iteration, the VPA method produces better channel estimates at the virtual pilots. However, current VPA schemes do not provide this information in the next iteration. Only the progressively improving estimates obtained in the data symbols are propagated. The E-VPA methods and devices disclosed herein maintain the same computational complexity of previously used VPA schemes while taking full advantage of the improvement for the estimates derived from the virtual pilots, i.e. data symbols. This results in higher throughputs than previously used VPA methods, especially in conditions of special interest for mm-waves communications and in high Doppler situations.

In an initial step, i.e. a first iteration, conventional demodulation techniques may be used in order to retrieve the channel observation from the UE-RS symbols, i.e. pilots. UE-RSs are demodulated assuming the underlying channel remains constant in either time (t) or in frequency. At the receiver side, the received signal at pilot position p can be written as:

$$z_p^{(r)} = \sum_{j=1}^{L/2} h_p^{(j,r)} o_p^{(j)} p_p + v_p^{(r)} \quad (1)$$

where $h_p^{(j,r)}$ is the effective channel (i.e. the precoded channel) from transmit (Tx) layer j to receive (Rx) antenna r, $o_p^{(j)}$ is the orthogonal cover code (OCC) pattern applied to the Tx layer j, $p_p$ is the transmitted pilot symbol, L is the number of Tx layers (L/2 share the same frequency resource), and $v_p^{(r)}$ is the additive white Gaussian noise (AWGN) of variance $1/\rho$.

In order to retrieve the information of the m-th layer of the UE-RS design in LTE, for example, the channel is assumed to be invariant during L/2 (where L is the symbol number) consecutive OFDM symbols containing the UE-RS (this group of L/2 pilot symbols will be hereinafter denoted as $\Omega$). Using the orthogonality of the OCC pattern, the interlayer interferences may be removed:

$$\tilde{z}_p^{(m,r)} = \frac{1}{L} \sum_{q \in \Omega}^{L/2} o_q^{(m)} p_q^* z_p^{(r)} = h_p^{(m,r)} + v_p'^{(r)} \quad (2)$$

where $v'_p^{(r)}$ is the effective noise of variance $1/\rho L$ and $$z_m = [\tilde{z}_0^{(m,r)}, \ldots, \tilde{z}_{N_p-1}^{(m,r)}]^T$$

is the m-th layer channel estimate at UE-RS positions obtained from the UE-RS demodulation.

Assuming that the receiver has statistical knowledge of the noise (variance) and of the channel, the channel can be estimated using a minimum mean square error (MMSE) filter:

$$\hat{h}_m = \text{Cov}(h_m, z_m)\text{Cov}(z_m, z_m)^{-1} z_m \quad (3)$$
$$= \text{Cov}(h_m, h_m)\left(\text{Cov}(h_m, h_m) + \frac{1}{\rho L}I\right)^{-1} z_m$$

where $$h_m = [h_0^{(m,r)}, \ldots, h_{N_p-1}^{(m,r)}]^T$$

and the covariance matrices are computed using Jake's model:

$$E[h_{k,l}^{(m,r)} h_{k+\Delta k, l+\Delta l}^{(m,r)}] \approx \frac{J_0(2\pi f_d T_S \Delta t)}{1 + j2\pi \tau_{rms} f_s \Delta l} \quad (4)$$

where $J_0$ is the 0-th order Bessel function, $f_s$ is the subcarrier spacing, $f_d$ is the maximum Doppler frequency, $T_S$ is the symbol duration, and $\tau_{rms}$ is the channel root-mean-square (RMS) delay spread.

Once the first iteration of the channel estimation is performed, the E-VPA scheme disclosed herein computes the MMSE estimate of the channel using the observation vector $z_m$ and an additional observation vector $y_m$ obtained from the data symbols and refines ensuing channel estimations based on previous iterations.

Figure 4:
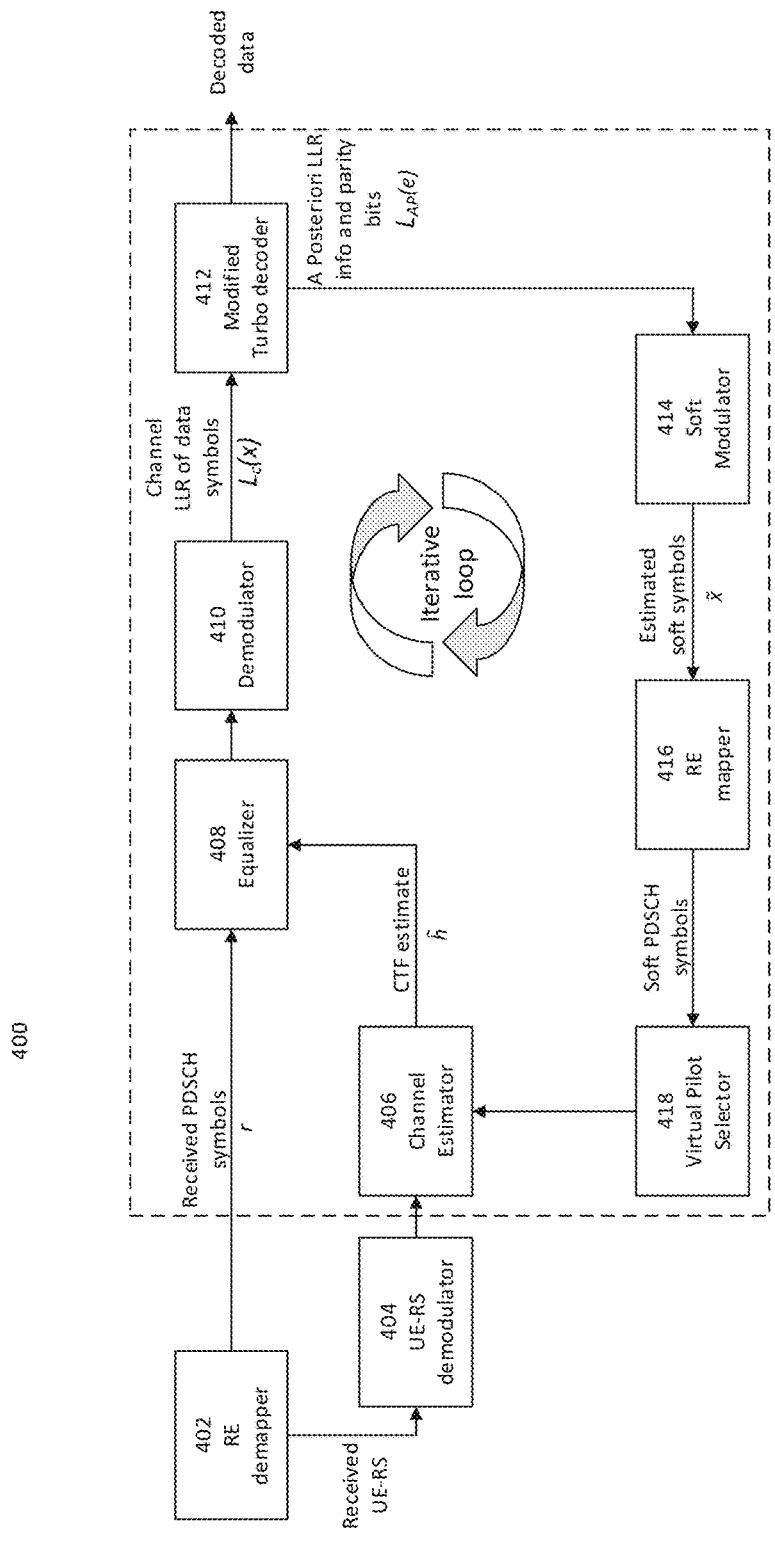
FIG. 4 shows an enhanced virtual pilot assisted channel estimation scheme in an aspect of this disclosure.

FIG. 4 shows a method for an exemplary E-VPA scheme 400 for ensuing iterations of the channel estimation in an aspect of this disclosure.

Upon receiving signals from the network, the UE de-maps the REs to determine the UE-RS. The initial channel estimate is performed in 406 after the UE-RS is demodulated in 404. This channel estimate is used to demodulate and decode the received PDSCH symbols.

After the initial channel estimate is computed by the channel estimator 406, the received data signal on the Physical Downlink Shared Channel (PDSCH) resource elements (REs) are demodulated 410 and decoded 412. The turbo decoder 412 outputs the log-likelihood ratio (LLR) of both the information bits and the parity bits.

Along the feedback chain, the soft modulator 414 maps the soft bits into estimated soft symbols, $\tilde{x}_d$, with each soft symbol representing the expected symbol according to the LLRs of the bits mapped into it. After the soft symbols are mapped onto REs in 416, the soft symbol sequence then goes through the Virtual Pilot Selector 418 so that only the $N_d$ most reliable soft symbols are fed back into the channel estimator 406. In one aspect of this disclosure, the most reliable symbols are the symbols in closest proximity to the reference pilot symbols. As a result, in addition to $z_m$, the channel estimator 406 obtains an additional observation vector $y_m$ to use in its calculations.

In order to define $y_m$, the received signal at virtual pilot (VP) position d can be written as:

$$y_d^{(r)} = \sum_{j=1}^{L} g_d^{(j,r)} x_d^{(j)} + n_d^{(r)} \quad (5)$$

where $g_d^{(j,r)}$ is the effective channel from layer j to Rx antenna r, $x_d^{(j)}$ is the data symbol sent from layer j, and $n_d^{(r)}$ is the AWGN of variance $1/\rho$. Given the channel estimate from the previous iteration and the estimated soft symbols, the inter-layer interference cancellation is performed and is shown by the following equation:

$$y_d^{(m,r)} = y_d^{(r)} - \sum_{\substack{j=0 \\ j \neq m}}^{L'-1} \hat{g}_d^{(j,r)} \bar{x}_d^{(j)} \qquad (6)$$

Correspondingly, the channel observation vector is:

$$y_d^{(m,r)} = \frac{\bar{x}_d^{(m)*}}{|\bar{x}_d^{(m)}|^2} y_d^{(m,r)} \approx g_d^{(m,r)} + n_d'^{(r)} \qquad (7)$$

where $$n'^{(r)}_d = \frac{\bar{x}_d^{(m)*}}{|\bar{x}_d^{(m)}|^2} n_d^{(r)}$$

is AWGN of variance $1/\rho |x_d^{(m)}|^2$ and $$y_m = [\tilde{y}_0^{(m,r)}, \ldots, \tilde{y}_{N_d-1}^{(m,r)}]^T.$$

Using $y_m$ as an additional observation vector, the VPA method computes the MMSE channel estimate as:

$$\hat{h}_m = \mathrm{Cov}\left(h_m, \begin{bmatrix} z_m \\ y_m \end{bmatrix}\right) \mathrm{Cov}\left(\begin{bmatrix} z_m \\ y_m \end{bmatrix}, \begin{bmatrix} z_m \\ y_m \end{bmatrix}\right)^{-1} \begin{bmatrix} z_m \\ y_m \end{bmatrix} \qquad (8)$$

$$= [\, C_{hh} \;\; C_{hg} \,] \begin{bmatrix} C_{hh} + \frac{1}{pL} I & C_{hg} \\ C_{gh} & C_{gg} + \mathrm{diag}\!\left(\frac{1}{\rho|\bar{x}_i^{(m)}|^2}\right) \end{bmatrix}^{-1} \begin{bmatrix} z_m \\ y_m \end{bmatrix}$$

where $C_{hh}=\mathrm{Cov}(h_m,h_m)$, $C_{hg}=\mathrm{Cov}(h_m,g_m)$, $C_{gg}=\mathrm{Cov}(g_m,g_m)$, and $$g_m = [g_m^{(m,r)}, \ldots, g_{N_d-1}^{(m,r)}]^T.$$

This improves the quality of the channel estimate, $\hat{h}_m$, especially after several iterations.

E-VPA can be defined using replacing Equation (8) with Equation (9):

$$\hat{h}_m^{(i)} = [\, C_{hh} \;\; C_{hg} \,] \begin{bmatrix} C_{hh} + \frac{1}{pL} I & C_{hg} \\ C_{gh} & C_{gg} + \mathrm{diag}\!\left(\frac{1}{\rho|\bar{x}_i^{(m)}|^2}\right) \end{bmatrix}^{-1} \begin{bmatrix} \hat{h}_m^{(i-1)} \\ y_m \end{bmatrix} \qquad (9)$$

By using $\hat{h}_m^{(i-1)}$ instead of $z_m$, the methods and devices of this disclosure depend less on the accuracy of the pilot-based CE. Put differently, the methods and device of this disclosure work without the assumption that the channel remains constant either in time or frequency within a sub-frame. Accordingly, in addition to using the demodulated UE-RS and the soft data symbols, the channel estimator 406 implements the channel estimation from the previous iteration ($\hat{h}_n^{(i-1)}$) in determining the next ($\hat{h}_m^{(i)}$) channel estimation. This leads to improvements in high Doppler scenarios where the channel cannot be assumed to be invariant during L/2 consecutive OFDM symbols, as shown by the gains illustrated in FIG. 5.

Figure 5:
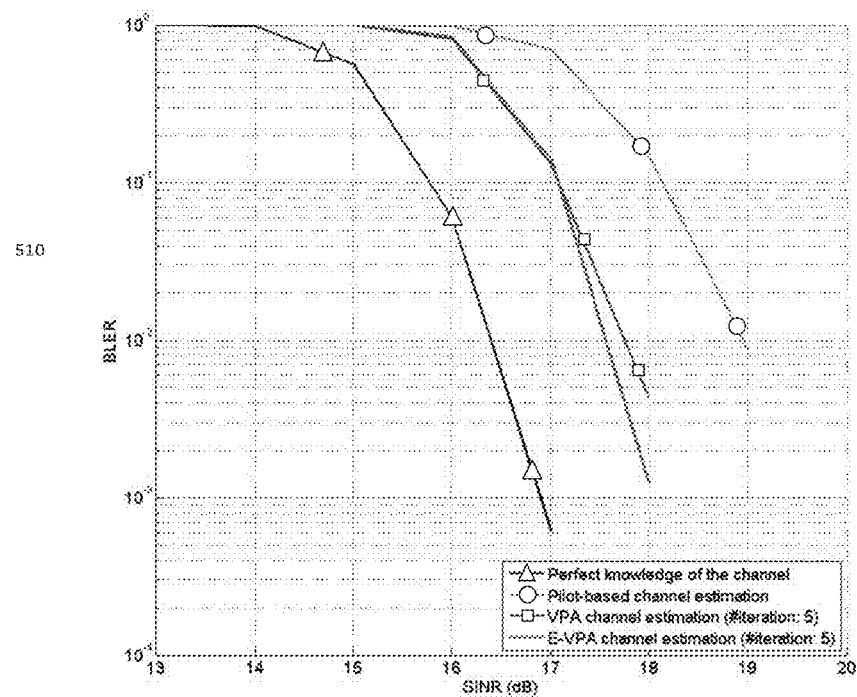
FIG. 5 shows graphs with simulation results in an aspect of this disclosure.
Figure 5:
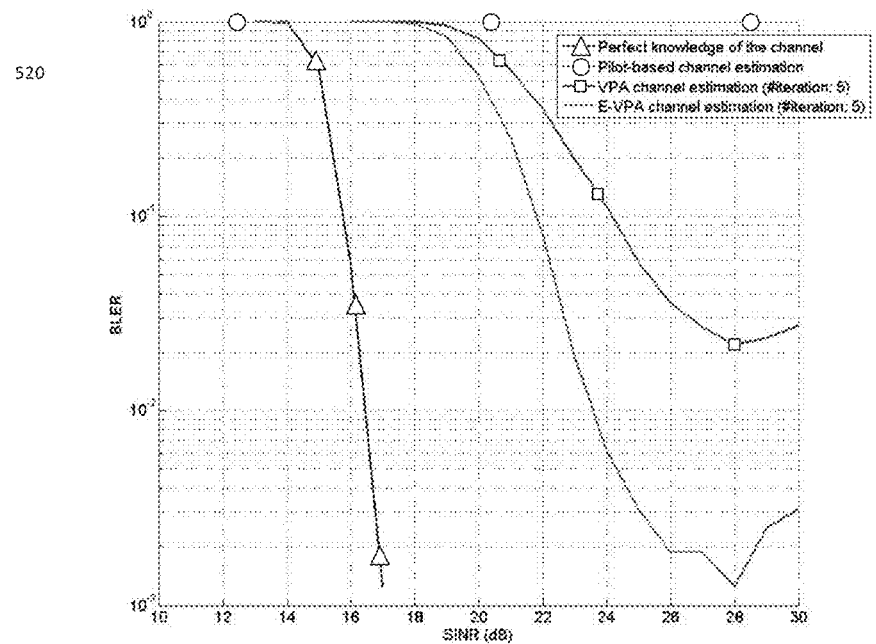

FIG. 5 shows two graphs, 510 and 520, demonstrating gains achieved in simulations implementing the methods and devices of this disclosure. The x-axis is the Signal to Interference Noise Ratio (SINR) in decibels (dBs) and the y-axis is the Block Error Rate (BLER). The curves marked by the circles show pilot-based channel estimation (using a linear minimum mean square error (LMMSE) channel estimation scheme), the curves marked by the squares show the virtual pilot assisted (VPA) channel estimation, and the unmarked curves shows the E-VPA channel estimation of this disclosure. The curves marked with the triangles represent the case where the channel is perfectly known at the receiver.

Graph 510 demonstrates the simulation results according to the following conditions: Modulation and Coding Scheme (MCS) 16, a 3GPP Extended Pedestrian A (EPA) model, and a velocity of 20 km/hr. As can be seen, in low Doppler conditions, minor improvements are noticeable for E-VPA over VPA.

However, in high Doppler conditions, the E-VPA scheme of this disclosure provides for marked improvements (up to 2 dBs) over VPA methods, as demonstrated in 520 with similar conditions to graph 510 except with a velocity of 100 km/hr.

FIG. 6 shows flowchart 600 detailing a method in an aspect of this disclosure. It is appreciated that flowchart 600 is exemplary in nature and may thus be simplified for purposes of this explanation.

In a first iteration of the channel estimation process, the channel estimate is determined based on a reference signal received at the device 602. For example, this may include conventional demodulation techniques to retrieve a channel observation from the pilot symbols in a reference signal.

Once the initial channel estimate is computed, in each respective ensuing iteration, a reference channel estimate based on the reference signal is used to decode a data signal received at the device. A data channel estimate is then determined based on at least one data symbol from the decoded signal in conjunction with the reference channel estimate 604.

The channel estimate for the respective iteration is then computed using the data channel estimate, the reference channel estimate, and the channel estimate from the previous iteration 606. For example, in the second iteration, the data channel estimate and the reference channel estimate computed in the second iteration are used to determine the channel estimation in conjunction with the channel estimation from the first iteration, which was computed solely using the reference signal. Then, in the third iteration, another reference channel estimate and another data channel estimate are computed and used in conjunction with the channel estimation from the second iteration to determine the channel estimation in the third iteration.

In Example 1, a method of performing channel estimation at a device, the method including: in a first iteration of channel estimation, determining a channel estimate based on at least a first pilot symbol of a reference signal received at the device; and in each respective iteration of one or more ensuing iterations: determining a reference channel estimate based on at least one subsequent pilot symbol of the reference signal received at the device; decoding a data signal received at the device based on the reference channel estimate; determining a data channel estimate based on at least one data symbol from the decoded data signal; and calculating a channel estimate for the respective iteration based on the reference channel estimate, the data channel estimate, and a channel estimate from a previous iteration.

In Example 2, the subject matter of Example 1 may include wherein the previous iteration is the first iteration.

In Example 3, the subject matter of Example 1 may include wherein the previous iteration is the iteration immediately preceding the respective iteration.

In Example 4, the subject matter of Examples 1-3 may include wherein the reference signal in the first iteration is a device specific reference signal.

In Example 5, the subject matter of Example 4 may include wherein the device specific reference signal comprises a plurality of pilot symbols.

In Example 6, the subject matter of Examples 1-5 may include wherein in the first iteration, the channel estimate is based on a demodulation of the first pilot symbol.

In Example 7, the subject matter of Examples 1-6 may include wherein in the first iteration, the channel estimate is determined based on the assumption that either time or frequency of the channel is constant.

In Example 8, the subject matter of Examples 1-7 may include wherein the subsequent pilot symbol in each respective iteration is different from the first pilot symbol.

In Example 9, the subject matter of Example 8 may include wherein pilot symbols in each respective iteration are different in at least one of time or frequency than the subsequent pilot symbol of other respective iterations.

In Example 10, the subject matter of Examples 1-9 may include wherein the data signal is a Physical Downlink Shared Channel (PDSCH).

In Example 11, the subject matter of Examples 1-10 may include wherein the reference signal represents one or more orthogonal frequency division multiplexing (OFDM) symbols.

In Example 12, the subject matter of Example 11 may include wherein the reference signal is encoded with an orthogonal cover code (OCC) prior to being received by the device.

In Example 13, the subject matter of Example 12 may include wherein an inter-layer interference is removed from the reference signal in at least the first iteration based on the orthogonality of the OCC.

In Example 14, the subject matter of Examples 1-13 may include wherein the channel estimate in the first iteration is determined by using a minimum mean square error (MMSE) filter.

In Example 15, the subject matter of Example 14 may include wherein the MMSE filter implements covariance matrices comprising symbols from the reference signal.

In Example 16, the subject matter of Example 15 may include wherein the covariance matrices are computed using Jake's model.

In Example 17, the subject matter of Examples 1-16 may include, in each respective iteration of one or more ensuing iterations, a turbo decoder outputting a log likelihood ratio (LLR) of information and parity bits of the decoded data signal In Example 18, the subject matter of Example 17 may include further comprising mapping at least one of the information or the parity bits into soft data symbols.

In Example 19, the subject matter of Example 18 may include wherein each soft symbol represents an expected symbol according to the LLR of the bits mapped into the soft symbol.

In Example 20, the subject matter of Example 19 may include selecting the most reliable soft symbols to use determining the channel estimate of each respective iteration.

In Example 21, the subject matter of Example 20 may include wherein selecting the most reliable soft symbols comprises evaluating a MMSE for each of a plurality of data symbols from the decoded data signal.

In Example 22, the subject matter of Example 21 may include wherein selecting the most reliable soft symbols further comprises selecting at least one data symbol with a highest MMSE value of the calculated MMSE values for each of the plurality of data symbols.

In Example 23, a computer readable medium with program instructions which when executed by a processor of a device, direct the device to perform the method of any one of Examples 1-22. The computer readable medium may be non-transitory.

In Example 24, a circuitry configured to perform channel estimation in a communication device, the circuitry configured to: in a first iteration of channel estimation, determine a channel estimate based on at least a first pilot symbol of a reference signal received at the device; in each respective iteration of one or more ensuing iterations: determine a reference channel estimate based on at least one subsequent pilot symbol of the reference signal received at the device; decode a data signal received at the device based on the reference channel estimate; determine a data channel estimate based on at least one data symbol from the decoded data signal; and calculate a channel estimate for the respective iteration based on the reference channel estimate, the data channel estimate, and a channel estimate from a previous iteration.

In Example 25, the subject matter of Example 24 may include a transceiver configured to receive the data and reference signals from a network.

In Example 26, the subject matter of Examples 24-25 may include wherein the previous iteration is the first iteration.

In Example 27, the subject matter of Examples 24-25 may include wherein the previous iteration is the iteration immediately preceding the respective iteration.

In Example 28, the subject matter of Examples 24-27 may include wherein the reference signal in the first iteration is a device specific reference signal.

In Example 29, the subject matter of Example 28 may include wherein the device specific reference signal comprises a plurality of pilot symbols.

In Example 30, the subject matter of Examples 24-29 may include wherein in the first iteration, the channel estimate is determined based on a demodulation of the first pilot symbol.

In Example 31, the subject matter of Examples 24-30 may include wherein in the first iteration, the channel estimate is based on the assumption that either time or frequency of the channel is constant.

In Example 32, the subject matter of Examples 24-31 may include wherein the subsequent pilot symbol in each respective iteration is different from the first pilot symbol.

In Example 33, the subject matter of Example 32 may include wherein pilot symbols in each respective iteration is different in at least one of time or frequency than the subsequent pilot symbol of other respective iterations.

In Example 34, the subject matter of Examples 24-33 may include wherein the data signal is a Physical Downlink Shared Channel (PDSCH).

In Example 35, the subject matter of Examples 24-34 may include wherein the reference signal represents one or more orthogonal frequency division multiplexing (OFDM) symbols.

In Example 36, the subject matter of Example 35 may include wherein the reference signal is encoded with an orthogonal cover code (OCC) prior to being received by the device.

In Example 37, the subject matter of Examples 24-36 may include a minimum mean square error (MMSE) filter to determine the channel estimation in the first iteration.

In Example 38, the subject matter of Example 37 may include wherein the MMSE filter is used to determine the channel estimations in the one or more ensuing iterations.

In Example 39, the subject matter of Examples 37-38 may include wherein the MMSE filter implements covariance matrices comprising symbols from the reference signal.

In Example 40, the subject matter of Example 39 may include wherein the circuitry computes the covariance matrices using Jake's model.

In Example 41, the subject matter of Examples 24-40 may include a turbo decoder configured to output a log likelihood ratio (LLR) of information and parity bits of the decoded data signal for each respective iteration of one or more ensuing iterations.

In Example 42, the subject matter of Example 41 may include a modulator configured to map at least one of the information or the parity bits into soft data symbols.

In Example 43, the subject matter of Example 42 may include wherein each soft symbol represents an expected symbol according to the LLR of the bits mapped into the soft symbol.

In Example 44, the subject matter of Examples 42-43 may include a selector configured to select the most reliable soft symbols to use in determining the channel estimate of the respective iteration.

In Example 45, the subject matter of Example 44 may include wherein selecting the most reliable soft symbols comprises evaluating a MMSE for each of a plurality of data symbols from the decoded data signal.

In Example 46, the subject matter of Example 45 may include wherein selecting the most reliable soft symbols further comprises selecting at least one data symbol with a highest MMSE value of the calculated MMSE values for each of the plurality of data symbols.

In Example 47, a communication device including: a transceiver configured to receive reference and data signals from a network; a baseband modem comprising processing circuitry configured to iteratively perform channel estimation based on the received reference and data signals, the processing circuitry including: a channel estimator configured to determine a respective channel estimate in each respective iteration of one or more iterations subsequent to a first iteration, the respective channel estimate based on one or more pilot symbols from a received reference signal, one or more data symbols from a received data signal, and a previous channel estimate from a previous iteration; and a memory configured to store the preceding channel estimate.

In Example 48, the subject matter of Example 47 may include wherein the previous iteration is the first iteration.

In Example 49, the subject matter of Example 47 may include wherein the previous iteration is the iteration immediately preceding the respective iteration.

In Example 50, the subject matter of Examples 47-49 may include wherein the reference signal in the first iteration is a device specific reference signal.

In Example 51, the subject matter of Example 50 may include wherein the device specific reference signal comprises a plurality of pilot symbols.

In Example 52, the subject matter of Examples 47-51 may include wherein in the first iteration, the channel estimate is determined based on a demodulation of a first pilot symbol.

In Example 53, the subject matter of Examples 47-52 may include wherein in the first iteration, the channel estimate is based on the assumption that either time or frequency of the channel is constant.

In Example 54, the subject matter of Examples 47-53 may include wherein a pilot symbol in each respective iteration is different from a first pilot symbol.

In Example 55, the subject matter of Example 54 may include wherein the pilot symbol in each respective iteration is different in at least one of time or frequency than the pilot symbol of other respective iterations.

In Example 56, the subject matter of Examples 47-55 may include wherein the data signal is a Physical Downlink Shared Channel (PDSCH).

In Example 57, the subject matter of Examples 47-56 may include wherein the reference signal represents one or more orthogonal frequency division multiplexing (OFDM) symbols.

In Example 58, the subject matter of Example 57 may include wherein the reference signal is encoded with an orthogonal cover code (OCC) prior to being received by the device.

In Example 59, the subject matter of Examples 47-58 may include the baseband modem further comprising a minimum mean square error (MMSE) filter to determine the channel estimation in the first iteration.

In Example 60, the subject matter of Example 59 may include wherein the MMSE filter is used to determine the channel estimations in the one or more ensuing iterations.

In Example 61, the subject matter of Examples 59-60 may include wherein the MMSE filter implements covariance matrices comprising symbols from the reference signal.

In Example 62, the subject matter of Example 61 may include wherein the baseband modem computes the covariance matrices using Jake's model.

In Example 63, the subject matter of Examples 47-62 may include the baseband modem further comprising a turbo decoder configured to output a log likelihood ratio (LLR) of information and parity bits of the decoded data signal for each respective iteration of one or more ensuing iterations.

In Example 64, the subject matter of Example 63 may include the baseband modem further comprising a modulator configured to map at least one of the information or the parity bits into soft data symbols.

In Example 65, the subject matter of Example 64 may include wherein each soft symbol represents an expected symbol according to the LLR of the bits mapped into the soft symbol.

In Example 66, the subject matter of Examples 47-65 may include the baseband modem further comprising a selector configured to select the most reliable soft symbols to use in determining the channel estimate of the respective iteration.

In Example 67, the subject matter of Example 66 may include wherein selecting the most reliable soft symbols comprises evaluating a MMSE for each of a plurality of data symbols from the decoded data signal.

In Example 68, the subject matter of Example 67 may include wherein selecting the most reliable soft symbols further comprises selecting at least one data symbol with a highest MMSE value of the calculated MMSE values for each of the plurality of data symbols.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuitry configured to perform channel estimation in a communication device, the circuitry configured to:
   in a first iteration of channel estimation, determine a channel estimate based on at least a first pilot symbol of a reference signal received at the device;
   in each respective iteration of one or more ensuing iterations:
   determine a reference channel estimate based on at least one subsequent pilot symbol of the reference signal received at the device;
   decode a data signal received at the device based on the reference channel estimate;
   determine a data channel estimate based on at least one data symbol from the decoded data signal; and
   calculate a channel estimate for the respective iteration based on a channel estimate from a previous iteration in addition to the reference channel estimate and the data channel estimate.

2. The circuitry of claim 1, wherein the previous iteration is the iteration immediately preceding the respective iteration.

3. The circuitry of claim 1, wherein the reference signal in the first iteration is a device specific reference signal.

4. The circuitry of claim 1, wherein the pilot symbol in each respective iteration is different in at least one of time or frequency than the subsequent pilot symbol of other respective iterations.

5. The circuitry of claim 1, wherein the data signal is a Physical Downlink Shared Channel (PDSCH).

6. The circuitry of claim 1, further comprising a minimum mean square error (MMSE) filter to determine the channel estimation in the first iteration.

7. The circuitry of claim 1, further comprising a turbo decoder configured to output a log likelihood ratio (LLR) of information and parity bits of the decoded data signal for each respective iteration of one or more ensuing iterations.

8. The circuitry of claim 7, further comprising a modulator configured to map at least one of the information or the parity bits into soft data symbols.

9. The circuitry of claim 8, further comprising a selector configured to select the most reliable soft symbols to use in determining the channel estimate of the respective iteration.

10. The circuitry of claim 9, wherein selecting the most reliable soft symbols comprises evaluating a MMSE for each of a plurality of data symbols from the decoded data signal.

11. A communication device comprising:
    a transceiver configured to receive reference and data signals from a network;
    a baseband modem comprising processing circuitry configured to iteratively perform channel estimation based on the received reference and data signals, the processing circuitry comprising:
    a channel estimator configured to determine a respective channel estimate in each respective iteration of one or more iterations subsequent to a first iteration, the respective channel estimate based on a previous channel estimate from a previous iteration in addition to one or more pilot symbols from a received reference signal and one or more data symbols from a received data signal; and
    a memory configured to store the previous channel estimate.

12. The communication device of claim 11, wherein the previous iteration is the iteration immediately preceding the respective iteration.

13. The communication device of claim 11, the baseband modem further comprising a minimum mean square error (MMSE) filter to determine the channel estimation in the first iteration.

14. The communication device of claim 11, the baseband modem further comprising a turbo decoder configured to output a log likelihood ratio (LLR) of information and parity bits of the decoded data signal for each respective iteration of one or more ensuing iterations.

15. The communication device of claim 11, the baseband modem further comprising a modulator configured to map at least one of the information or the parity bits into soft data symbols.

16. The communication device of claim 11, the baseband modem further comprising a selector configured to select the most reliable soft symbols to use in determining the channel estimate of the respective iteration, wherein selecting the most reliable soft symbols comprises evaluating a MMSE for each of a plurality of data symbols from the decoded data signal.

17. A method of performing channel estimation at a device, the method comprising:
    in a first iteration of channel estimation, determining a channel estimate based on at least a first pilot symbol of a reference signal received at the device; and
    in each respective iteration of one or more ensuing iterations:

determining a reference channel estimate based on at least one subsequent pilot symbol of the reference signal received at the device;

decoding a data signal received at the device based on the reference channel estimate;

determining a data channel estimate based on at least one data symbol from the decoded data signal; and calculating a channel estimate for the respective iteration based on a channel estimate from a previous iteration in addition to the reference channel estimate and the data channel estimate, further comprising, in each respective iteration of one or more ensuing iterations, a turbo decoder outputting a log likelihood ratio (LLR) of information and parity bits of the decoded data signal.

18. The method of claim 17, wherein the previous iteration is the iteration immediately preceding the respective iteration.

19. The method of claim 17, wherein the reference signal in the first iteration is a device specific reference signal.

20. The method of claim 17, wherein the data signal is a Physical Downlink Shared Channel (PDSCH).

21. The method of claim 17, further comprising mapping at least one of the information or the parity bits into soft data symbols.

22. A non-transitory computer readable medium with program instructions, which when executed by a processor of a device, direct the device to perform the a channel estimation, comprising:

in a first iteration of channel estimation, determining a channel estimate based on at least a first pilot symbol of a reference signal received at the device; and in each respective iteration of one or more ensuing iterations:

determining a reference channel estimate based on at least one subsequent pilot symbol of the reference signal received at the device;

decoding a data signal received at the device based on the reference channel estimate;

determining a data channel estimate based on at least one data symbol from the decoded data signal; and calculating a channel estimate for the respective iteration based on a channel estimate from a previous iteration in addition to the reference channel estimate and the data channel estimate.

23. The non-transitory computer readable medium of claim 22, wherein the previous iteration is the iteration immediately preceding the respective iteration.

24. The non-transitory computer readable medium of claim 22, further comprising, in each respective iteration of one or more ensuing iterations, directing a turbo decoder to output a log likelihood ratio (LLR) of information and parity bits of the decoded data signal.

* * * * *